July 28, 1964                  E. WARREN                    3,142,748

ELECTRIC COOKING RANGES

Filed April 11, 1962                                              3 Sheets-Sheet 2

Inventor
Ernest Warren
By
Watson, Cole, Grindle & Watson
Attorneys

July 28, 1964 E. WARREN 3,142,748
ELECTRIC COOKING RANGES
Filed April 11, 1962 3 Sheets-Sheet 3
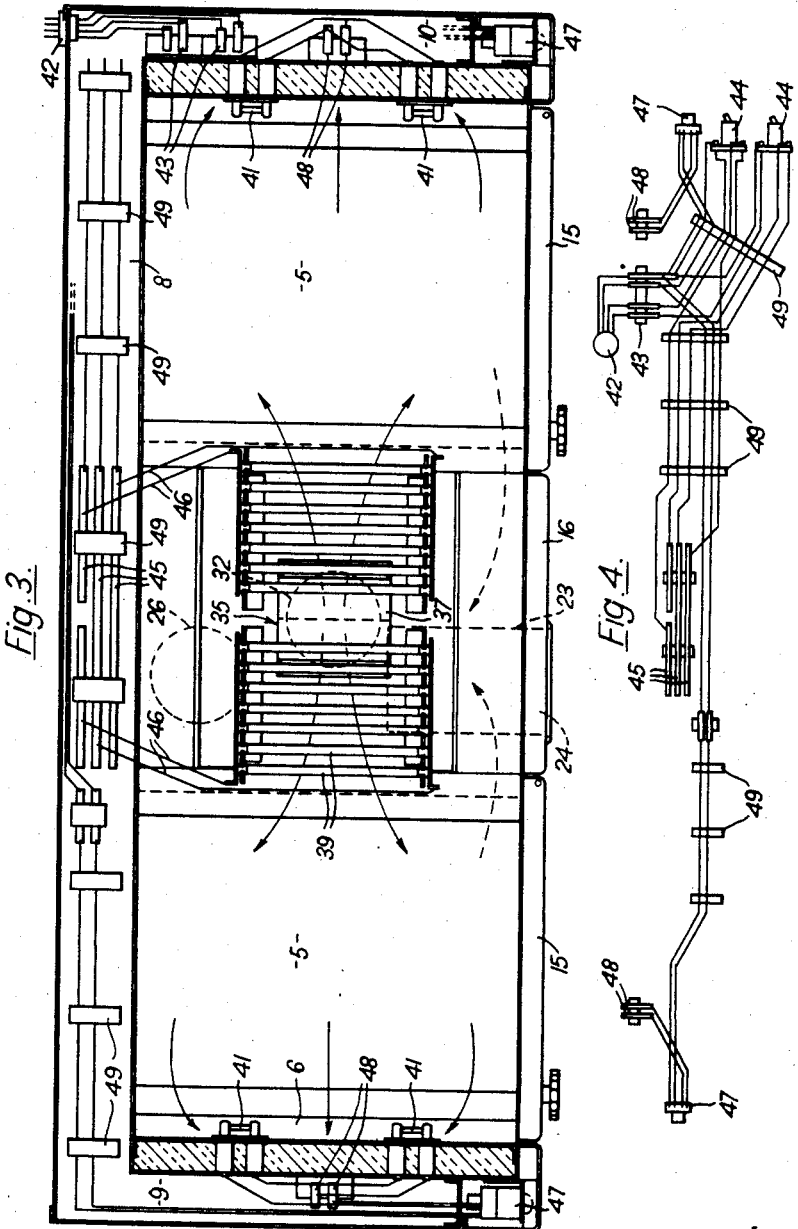
Inventor
Ernest Warren
By
Watson, Cole, Grindle & Watson
Attorneys

United States Patent Office 3,142,748
Patented July 28, 1964

3,142,748
ELECTRIC COOKING RANGES
Ernest Warren, Ecclesfield, England, assignor to William Green & Co. (Ecclesfield) Limited
Filed Apr. 11, 1962, Ser. No. 186,807
Claims priority, application Great Britain May 18, 1961
4 Claims. (Cl. 219—392)

This invention relates to electric cooking ranges, particularly of the heavy duty type as used in catering establishments, on board ship, and in institutions.

According to the present invention, an electric cooking range comprises at least one oven below a hot plate that is of greater extent than the width of the oven, electric heating elements below the part of the hot plate below which there is no oven, a flue between the hot plate and the top of the oven, communicating in turn to externally insulated flues down the end and under the bottom of the oven, and a fan to force air in closed circuit past the elements and over and round the oven.

More than one set of electric heating elements may be located below the hot plate, in accordance with the extent of the area to be directly heated. Additional elements may be provided for the further heating of the air circulated by the fan. Thus, subsidiary heating elements may be located in an end flue of the or each oven, and/or in a bottom flue if roasting temperature is required. In this way, air already heated by passing over the hot-plate elements can be raised to any oven temperature required, which may be thermostatically controlled. The circulation of the air over the flue elements avoids local overheating and reduces loss by radiation externally of the flues.

The fan, and its driving motor, may be contained in a compartment, alongside and insulated from the oven, below the hot plate elements, and shielded from the elements by a barrier of insulating material through which the discharge outlet of the fan passes.

Advantageously, a range comprises two ovens, one at each side of a central fan compartment, the hot plate extending over both ovens and the compartment.

The forced circulation provides both for economical heating of the oven or ovens and for maintaining the hot plate area above the oven or ovens at a temperature lower than that of the directly heated area. Thus, the directly heated area enables boiling to be carried out, while the rest of the area serves for the simmering that is all that is necessary for a large proportion of the cooking operations undertaken on the range.

The oven temperature may be thermostatically controlled, e.g., by the cutting in and out of part or all of a set of elements through which the air is forced. The fan itself may likewise be switched in and out, preferably, however, by means of a main switch. Again, a damper may be provided in the fan outlet to control the rate of circulation.

With two sets of elements provided, one for directly heating the portion of the hot plate required for boiling, and the other for heating the air in circulation, the thermostatic control in accordance with oven temperature effects a control over the temperature of the portion or portions of the hot plate required for simmering.

The circulating air gives a high rate of heat transfer to the oven or ovens, with the result that a lower loading is required to maintain a range of given size at a given duty. Moreover, keeping a proportion of the hot plate at a less temperature than is required for boiling reduces heat losses considerably. Consequently, the range operates at low running cost.

A preferred embodiment of a 2-oven range will now be described with reference to the accompanying drawings, in which FIGURE 1 is a part-sectional front-elevation of the range;

FIGURE 3 is a part-sectional plan of the range with the whole of the top removed; and FIGURE 4 is a wiring diagram.

Figure 2:
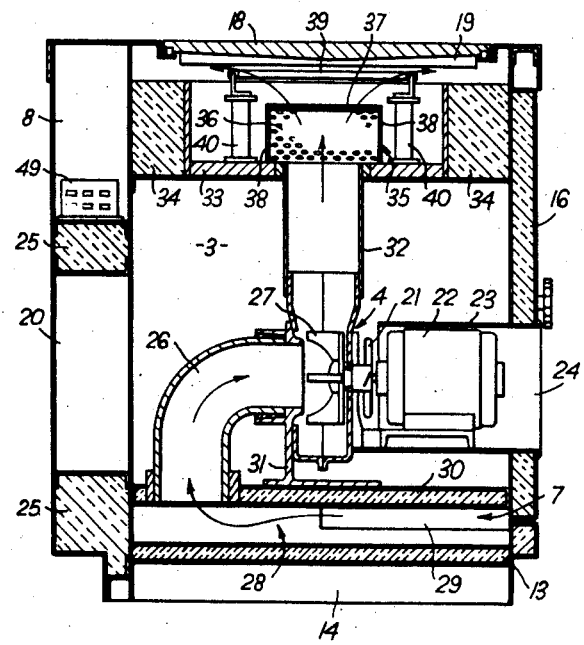
FIGURE 2 is a vertical section taken on the line II—II of FIGURE 1.

The main structure of the range is carried out in sheet-metal to provide two oven spaces 1, 2, a central compartment 3 for a motor-driven fan 4, top flues 5, end flues 6, and bottom flues 7 for the ovens, a full-length chamber 8 along the back, and end chambers 9, 10, together with upright insulation-filled panels 11 between the ovens 1, 2 and the fan chamber 3; 12 between the end flues 6 and the end chambers 9, 10; and 13 between the bottom flues 7 and an air space 14 separating the main installation from the floor. The ovens have insulated doors 15 and an insulated front panel 16 is removable for access to the fan chamber 3. The hot plate has a smooth upper surface formed by side sections 17, one over each oven, and a central section 18, all removable iron castings, with the section 18 stiffened by ribs 19 (FIGURE 2).

An opening 20 (FIGURE 2) through the rear chamber 8 allows air to be drawn into the fan chamber 3 and forced by a fan 21 to pass closely over the motor 22, which is enclosed by a housing 23 opening at 24 at the front of the range through the panel 16. Insulating material 25 surrounds the opening 20 in the chamber 8, and the chamber 8 also contains insulating material (not shown) across the back of each oven 1, 2.

An intake 26 leading to the impeller 27 of the fan 4 receives air from a flue 28 below the fan chamber 3. Air from the bottom flues 7 reaches the flue 28 through openings 29 that extend only half-way towards the rear of the flues 7, so that air is drawn towards the front of the bottoms of the ovens. An insulation panel 30, on which the fan mounting 31 is carried, protects the motor 22 from the temperature existing in the flue 28 by reason of the flow of hot air from the bottom flues 7.

The impeller 27 discharges air by a duct 32 that passes through an insulating panel 33, flanked by insulating blocks 34, above the fan chamber 3, the air emerging inside a distributor 35 consisting of two perforated plates 36 forming an inverted V below a plain plate 37, the ends of the V being closed by plates 38. The plates 36 discharge towards the respective top flues 5 of the ovens 1, 2.

Above, and extending sideways from, the distributor 35, are two sets 39 of heating elements carried by pillars 40 from the panel 33 and lying below the central section 18 of the hot plate. Air passing from the distributor 35 is thus forced to pass over some of the heating elements, so that these elements serve the double purpose of heating the central section 18 to a boiling temperature and of heating air that is to pass through the flues 5, 6, 7 round the top, end, and bottom of each oven. The hot air flow through the flues 5 also serves to keep the outer sections 17 of the hot plate at a simmering temperature.

Subsidiary heating elements 41 depend into each end flue 6, to boost the heating of the air on its way to the bottom flues 7 of the ovens 1, 2 when required. Since the hot air leaving the flues 7 is immediately carried by the impeller 27 of the fan 4 to the hot plate elements 39, a continuous current of air at any desired temperature is made available for heating each oven, with the forced circulation providing for effective heat transfer to the ovens. If desired, further heating elements can be mounted below the hot plate elements 39, to serve primarily for heating the air streams, thus leaving the elements 39 for their main duty of heating the central section 18 of the hot plate.

The elements 39 are of the straight, open-coil type, and the booster elements 41 (two to each flue 6) of the U-form tubular sheath type. All are readily accessible for attention and replacement on lifting of the sections 17, 18. Other types of element may of course be used. Thus, the elements 39 could be of the tubular sheath type, of U-form or of flat spiral form.

The rear chamber 8 and the end chambers 9, 10 serve to contain the wiring, switches, and thermostats. The complete wiring diagram of FIGURE 4 supplements FIGURE 3, where superimposition of some of the leads does not permit all of them to be seen in the chamber 8. 3-phase current is received at a terminal block 42, the fan motor 22 being switched in simultaneously with the closing of a mains switch (not shown) to which the block 42 is connected. From terminals 43, the supply is taken via switches 44, one for each set of hot plate elements 39, to busbars 45 in the chamber 8 from which leads 46 pass to the elements, and also via adjustable thermostats 47 to terminals 48 for the booster elements 41. The wiring and the busbars 45 are supported in the chambers 8, 9 by insulating cleats 49.

Figure 1:
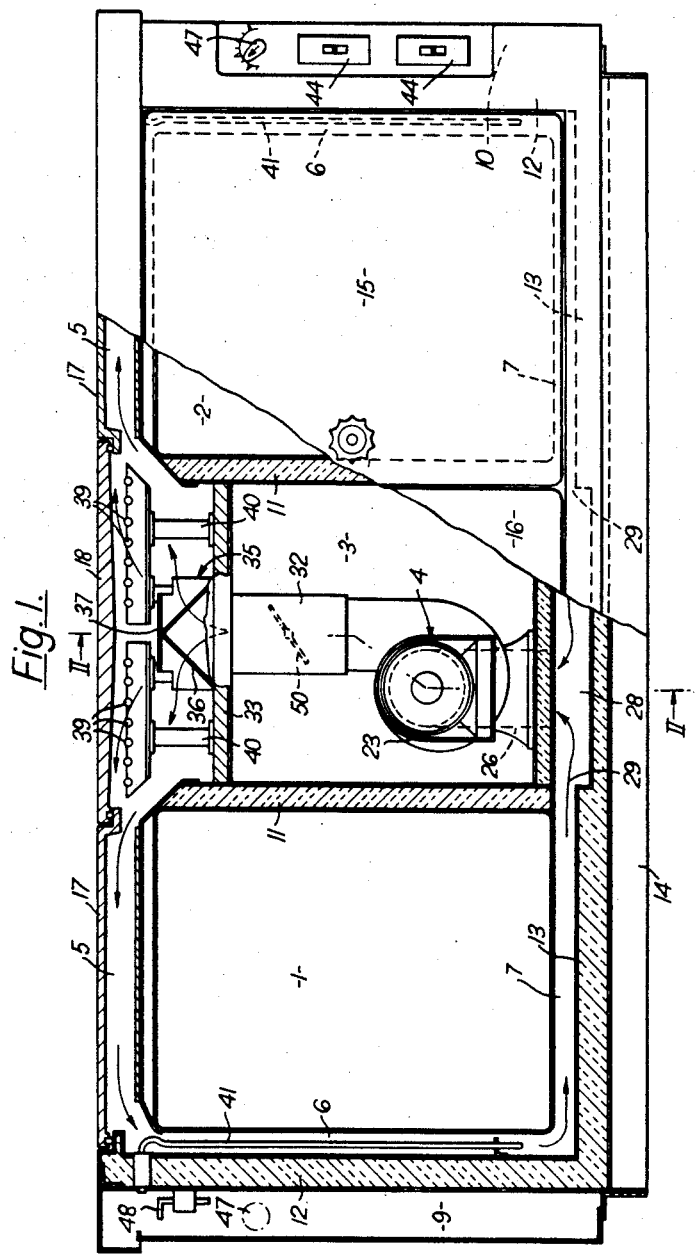

As shown by FIGURE 1, a damper 50 may be provided in the fan discharge duct 32 to control the rate of air circulation.

With the thermostatic control 47 provided for the booster elements 41, a single separate main switch serves to put the whole range into operation, supplemented by the secondary switches to control individually the two sets of hot plate elements 39. The whole control of the range is much simplified as compared with a range having a multiplicity of switches for individual control of oven elements and elements under different portions of the whole of the hot plate area. The installation cost is correspondingly reduced.

The installation standing slightly clear of the floor because of the air space 14, the bottom insulation 13 does not rest on the floor. The height of the top surface of the sections 17, 18 of the hot plate then mainly depends on the height of the oven. A typical instance of a 2-oven installation has oven spaces 1, 2 about 2'0" high, 1'8" wide, and 2'0" from front to back, giving a total height of the range of about 2'10", a depth of about 2'6", and an overall length of about 6'6", the hot plate area being about 15 square feet. These dimensions are of course only given by way of example.

What I claim is:

1. An electric cooking range comprising at least one oven with a simmering section of a hot plate above it and spaced from it to provide a top flue, together with externally insulated flues down the end and under the bottom of the oven in continuation of the top flue, there being a boiling section of the hot plate below which there is no oven, and electric heating elements disposed close to the undersurface of the boiling section as to effect direct heating of that section, and a fan to force air in closed circuit over the elements and thence into the top flue below the continuing simmering section of the hot plate and round the flues of the oven below the simmering section.

2. An electric cooking range as in claim 1, comprising additional electric heating elements in at least one of the end and bottom oven flues.

3. An electric cooking range comprising at least one oven with a simmering section of a hot plate above it and spaced from it to provide a top flue, together with externally insulated flues down the end and under the bottom of the oven in continuation of the top flue, there being a boiling section of the hot plate below which there is no oven, and electric heating elements disposed close to the undersurface of the boiling section as to effect direct heating of that section, and a fan to force air in closed circuit towards the boiling section of the hot plate, and a distributor consisting of a plate to impede direct impinging of the air on that section and a perforated plate to direct the air over the elements and thence into the top flue below the continuing simmering section of the hot plate and round the flues of the oven below the simmering section.

4. An electric cooking range comprising a hot plate with a boiling section, a compartment having an insulated top spaced from the boiling section, electric heating elements disposed close to the undersurface of the boiling section in the space between that section and the top of the compartment, an oven at at least one side of the compartment and insulated therefrom, a simmering section of the hot plate over the oven in continuation of the boiling section, with an intervening top flue connected to the space containing the heating elements, end and bottom flues in series with the top flue, a fan and a driving motor therefor in the insulated compartment, the fan having an inlet connected to the bottom flue and an outlet discharging into the space containing the heating elements, and a distributor to direct the discharge from the fan over the elements and towards the top flue.

References Cited in the file of this patent
UNITED STATES PATENTS

| | | |
|---|---|---|
| 86,785 | Steffe | Feb. 9, 1869 |
| 2,164,265 | Wilson | June 27, 1939 |
| 2,417,842 | Sanford et al. | Mar. 25, 1947 |